United States Patent
Khanfar et al.

(10) Patent No.: US 10,543,717 B2
(45) Date of Patent: Jan. 28, 2020

(54) VARIABLE-WALL LIGHT-WEIGHT AXLE SHAFT WITH AN INTEGRAL FLANGE MEMBER AND METHOD FOR MAKING THE SAME

(71) Applicant: U.S. Manufacturing Corporation, Warren, MI (US)

(72) Inventors: Adel Mohd Khanfar, Sterling Heights, MI (US); Earl Paul Barker, II, St. Clair, MI (US)

(73) Assignee: AAM INTERNATIONAL S.À R.L., Luxembourg (LU)

( * ) Notice: Subject to any disclaimer, the term of this patent is extended or adjusted under 35 U.S.C. 154(b) by 0 days.

(21) Appl. No.: 15/448,251

(22) Filed: Mar. 2, 2017

(65) Prior Publication Data

US 2017/0173999 A1 Jun. 22, 2017

Related U.S. Application Data

(62) Division of application No. 14/247,747, filed on Apr. 8, 2014, now Pat. No. 9,670,951.

(51) Int. Cl.
*B60B 35/12* (2006.01)
*F16C 3/02* (2006.01)
(Continued)

(52) U.S. Cl.
CPC .............. *B60B 35/122* (2013.01); *B21C 1/18* (2013.01); *B21C 1/24* (2013.01); *B21C 23/085* (2013.01);
(Continued)

(58) Field of Classification Search
CPC ...... B21D 19/00; B21D 19/08; B21D 19/088; B21D 21/00; B21D 41/026; B21J 17/02;
(Continued)

(56) References Cited

U.S. PATENT DOCUMENTS

| 353,929 A | 12/1886 | Fitz Gerald |
| 359,136 A | 3/1887 | Dalzell |

(Continued)

FOREIGN PATENT DOCUMENTS

| CN | 1036354 | 10/1989 |
| EP | 1 839 772 A1 | 10/2007 |

(Continued)

OTHER PUBLICATIONS

International Search Report dated Jun. 29, 2015 for PCT/US2015/024134, 3 pages.

(Continued)

*Primary Examiner* — Christopher M Koehler
(74) *Attorney, Agent, or Firm* — Foley & Lardner LLP

(57) ABSTRACT

A drive axle shaft and method for making the same are provided. The drive axle shaft includes an elongate tubular body and a wheel flange. The elongate tubular body has a longitudinal axis and comprises a first end portion and a second end. The second end is configured to be coupled to a side gear in a differential. The wheel flange is disposed at the first end portion and is configured to support a vehicle wheel. The elongate tubular body and the wheel flange are formed as a unitary body without any weld therebetween.

20 Claims, 5 Drawing Sheets

(51) Int. Cl.
*H05B 6/02* (2006.01)
*B21D 19/00* (2006.01)
*B21C 23/08* (2006.01)
*B21K 21/12* (2006.01)
*B21J 5/08* (2006.01)
*B21K 1/06* (2006.01)
*B21C 1/18* (2006.01)
*B21C 1/24* (2006.01)
*B60B 27/06* (2006.01)
*B60B 35/14* (2006.01)

(52) U.S. Cl.
CPC ............... *B21D 19/00* (2013.01); *B21J 5/08* (2013.01); *B21K 1/063* (2013.01); *B21K 21/12* (2013.01); *B60B 27/06* (2013.01); *B60B 35/14* (2013.01); *F16C 3/02* (2013.01); *H05B 6/02* (2013.01); *B60B 2900/111* (2013.01); *B60B 2900/113* (2013.01)

(58) Field of Classification Search
CPC .. B21C 23/085; F16C 3/02; F16C 3/00; F16C 3/026; Y10T 29/49865; B60B 35/12; B60B 35/121; B60B 35/122; B60B 35/14
USPC .... 72/367.1, 370.01, 370.02, 370.03, 370.11
See application file for complete search history.

(56) References Cited

U.S. PATENT DOCUMENTS

| | | |
|---|---|---|
| 649,497 A | 5/1900 | Wales |
| 811,076 A | 1/1906 | Miller |
| 981,697 A | 1/1911 | Simpson |
| 983,849 A | 2/1911 | Wales |
| 1,104,088 A | 7/1914 | Wales |
| 1,417,806 A | 5/1922 | De Lapotterie |
| 1,776,855 A | 9/1930 | Holmes |
| 1,822,093 A | 9/1931 | Hendrickson et al. |
| 1,823,158 A | 9/1931 | Mogford |
| 1,873,453 A | 8/1932 | Mogford et al. |
| 1,945,076 A | 1/1934 | Riemenschneider |
| 1,945,080 A | 1/1934 | Thoms |
| 1,955,824 A | 4/1934 | Mogford |
| 1,964,258 A | 6/1934 | Graham |
| 1,983,584 A | 12/1934 | Urschel |
| 2,013,786 A | 9/1935 | Mogford et al. |
| 2,019,811 A | 11/1935 | Graham |
| 2,065,595 A | 12/1936 | Lynch |
| 2,124,406 A | 7/1938 | Spatta |
| 2,127,625 A | 8/1938 | Benedetto |
| 2,133,091 A | 10/1938 | Gettig |
| 2,150,948 A | 3/1939 | Spatta |
| 2,313,116 A | 3/1943 | Babcock |
| 2,543,811 A | 3/1951 | Snow et al. |
| 2,569,248 A | 9/1951 | Miller |
| 2,611,656 A | 9/1952 | Vanderberg |
| 2,649,922 A | 8/1953 | Hutchinson et al. |
| 2,667,047 A | 1/1954 | Mennear |
| 2,876,573 A | 3/1959 | Schmidt |
| 3,024,626 A * | 3/1962 | Frischman ............... C21D 9/28 295/36.1 |
| 3,225,581 A | 12/1965 | Gottlob |
| 3,247,698 A | 4/1966 | Baldwin et al. |
| 3,465,418 A | 9/1969 | Clark |
| 3,584,373 A | 6/1971 | Schane |
| 3,631,585 A | 1/1972 | Stamm |
| 3,701,564 A | 10/1972 | Puzik |
| 3,836,272 A | 9/1974 | Duer |
| 3,845,622 A | 11/1974 | Hufstader |
| 3,886,649 A | 6/1975 | Simon |
| 3,968,919 A | 7/1976 | Beijen |
| 4,087,038 A | 5/1978 | Yagi |
| 4,100,781 A | 7/1978 | Zawacki et al. |
| 4,192,167 A | 3/1980 | Huebner |
| 4,198,843 A | 4/1980 | Spence |
| 4,208,900 A | 6/1980 | Zawacki |
| 4,213,351 A | 7/1980 | Rowlinson |
| 4,223,825 A | 9/1980 | Williams |
| 4,261,193 A | 4/1981 | Boik |
| 4,277,969 A | 7/1981 | Simon |
| 4,301,672 A | 11/1981 | Simon |
| 4,407,056 A | 10/1983 | Watanabe et al. |
| 4,435,972 A | 3/1984 | Simon |
| 4,452,063 A | 6/1984 | Sebastiani |
| 4,487,357 A | 12/1984 | Simon |
| 4,551,115 A | 11/1985 | Ferguson |
| 4,659,005 A | 4/1987 | Spindler |
| 4,768,839 A | 9/1988 | Spindler |
| 5,205,464 A | 4/1993 | Simon |
| 5,213,250 A | 5/1993 | Simon |
| 5,303,985 A | 4/1994 | Barnholt et al. |
| 5,711,393 A | 1/1998 | Gage |
| 5,829,911 A | 11/1998 | Yokota |
| 5,946,365 A | 8/1999 | Drillon |
| 6,038,771 A | 3/2000 | Takehara |
| 6,059,378 A | 5/2000 | Dougherty et al. |
| 6,083,108 A | 7/2000 | Grubish |
| 6,230,540 B1 | 5/2001 | Wilch et al. |
| 6,327,771 B1 | 12/2001 | Anglin |
| 6,439,672 B1 | 8/2002 | Simon |
| 6,530,859 B2 | 3/2003 | Boston et al. |
| 6,557,947 B1 | 5/2003 | Hunt |
| 6,572,199 B1 | 6/2003 | Creek et al. |
| 6,698,078 B2 | 3/2004 | Prucher |
| 6,752,560 B2 | 6/2004 | Wilson et al. |
| 6,817,098 B2 | 11/2004 | Yuan |
| 7,412,866 B2 | 8/2008 | Jahani et al. |
| 7,854,438 B2 | 12/2010 | Richardson |
| 8,109,000 B2 | 2/2012 | Zalanca et al. |
| 2002/0198075 A1 | 12/2002 | Prucher |
| 2003/0093888 A1 | 5/2003 | Prucher |
| 2003/0221474 A1 | 12/2003 | Sorgi |
| 2004/0060385 A1 | 4/2004 | Prucher |
| 2006/0131949 A1 | 6/2006 | Jahani et al. |
| 2006/0183561 A1 * | 8/2006 | Briggs ............... B21J 5/12 464/179 |
| 2009/0270187 A1 | 10/2009 | Matsubara et al. |
| 2010/0068428 A1 | 3/2010 | Derse |
| 2010/0244546 A1 | 9/2010 | Milio et al. |
| 2010/0272504 A1 | 10/2010 | Sheth et al. |
| 2010/0308612 A1 | 12/2010 | Antunes et al. |
| 2013/0207446 A1 | 8/2013 | Marro et al. |

FOREIGN PATENT DOCUMENTS

| | | |
|---|---|---|
| FR | 446937 | 12/1912 |
| FR | 2023678 | 8/1970 |
| GB | 0 361 308 | 11/1931 |
| GB | 0 473 670 | 10/1937 |
| GB | 0 479 043 | 1/1938 |
| GB | 1 135 861 | 12/1968 |
| GB | 1 183 099 | 3/1970 |
| GB | 1 226 740 A | 3/1971 |
| GB | 2 319 584 | 5/1998 |
| JP | 50137371 | 10/1975 |
| JP | 63109210 | 5/1988 |
| JP | 2000140980 | 5/2000 |
| JP | 201017727 | 8/2010 |
| KR | 20080030821 A | 4/2008 |
| KR | 2013/0013546 | 2/2013 |
| WO | WO-2005/097520 | 10/2005 |
| WO | WO-2013/116892 A1 | 8/2013 |

OTHER PUBLICATIONS

Written Opinion of the International Search Authority dated Jun. 3, 2015 for PCT/US2015/024134, 4 pages.
EP Search Report and Search Opinion dated Aug. 18, 2015 regarding Application No. EP15162.
European Search Report for Application EP 15 16 2837 dated Aug. 11, 2015, 2 pages.

(56) References Cited

OTHER PUBLICATIONS

European Search Report for Application EP 15 16 2839 dated Jul. 27, 2015, 2 pages.
International Search Report for Application No. PCT/US2015/024135 dated Jun. 29, 2015, 3 pages.
International Search Report for Application No. PCT/US2015/036197 dated Sep. 30, 2015, 5 pages.
International Search Report for Application No. PCT/US2015/036204 dated Sep. 29, 2015, 5 pages.
Tuzun, Aydin et al. "Analysis of Tube Upsetting—A Thesis Submitted to the Graduate School of Natural and Applied Sciences of Middle East Technical University", Dec. 2004, pp. 1-120.
Written Opinion for Application No. PCT/US2015/024135 dated Jun. 3, 2015, 5 pages.

* cited by examiner

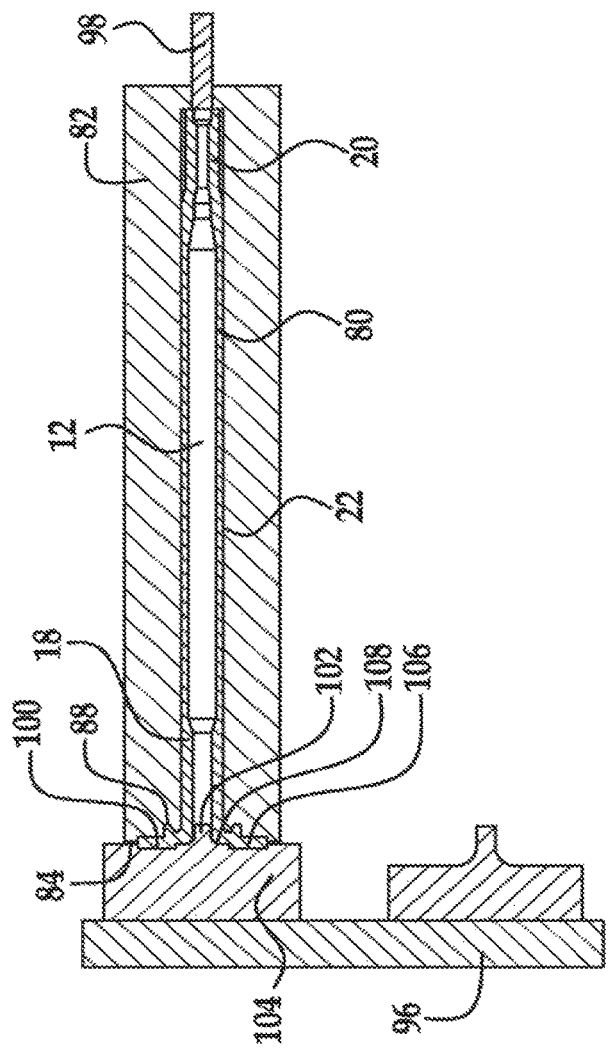
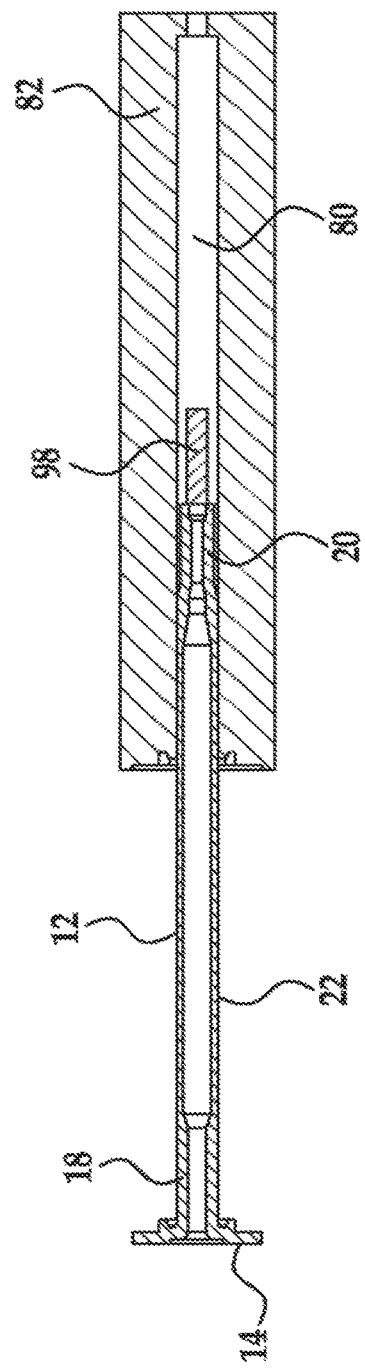
FIG. 3J
FIG. 3K

VARIABLE-WALL LIGHT-WEIGHT AXLE SHAFT WITH AN INTEGRAL FLANGE MEMBER AND METHOD FOR MAKING THE SAME

CROSS-REFERENCE TO RELATED APPLICATIONS

This application is a Divisional of U.S. patent application Ser. No. 14/247,747, filed Apr. 8, 2014, the entire disclosure of which is hereby incorporated by reference herein.

BACKGROUND

This application relates to axle shafts. In particular, the application relates to a variable-wall light-weight drive axle shaft with an integral flange member and a method for forming the drive axle shaft.

Axle shafts are often subjected to significant loads. Vehicle drive axle shafts, for example, transmit significant torque to the vehicle wheels and are subject to rapid starts and stops in operation. Because of the significant loads that are often imposed on axle shafts, most axle shafts are formed of solid metal to provide sufficient rigidity and strength. Solid axle shafts, however, require a significant amount of material and are relatively heavy. In vehicles, this weight has a negative effect on fuel economy and imposes additional loads on other vehicle components.

Because of the disadvantages associated with solid drive axle shafts, hollow drive axle shafts have been developed as shown, for example, in U.S. Pat. No. 5,213,250, the entire disclosure of which is incorporated herein by reference. Existing methods for forming hollow axle shafts, however, make it difficult to both quickly manufacture multiple axle shafts while also varying the inner and/or outer diameters of the shafts to achieve the objectives of a particular application for the shafts. Moreover, existing hollow drive axle shafts include a tubular body and a separately forged wheel flange that is friction welded to the body by rotating one or both of the flange and body relative to one another. The process of joining the wheel flange to the body requires a relatively large amount of time and manufacturing equipment and produces a joint between the flange and body that remains subject to fatigue and potential separation under certain loads.

The inventor herein has recognized a need for a drive axle shaft and a method for forming the drive axle shaft that will minimize and/or eliminate one or more of the above-identified deficiencies.

SUMMARY

One embodiment relates to a drive axle shaft including an elongate tubular body and a wheel flange. The elongate tubular body has a longitudinal axis and comprises a first end portion and a second end. The second end is configured to be coupled to a side gear in a differential. The wheel flange is disposed at the first end portion and is configured to support a vehicle wheel. The elongate tubular body and the wheel flange are formed as a unitary body without any weld therebetween.

Another embodiment relates to a drive axle shaft including an elongate tubular body and a wheel flange. The elongate tubular body has a longitudinal axis and comprises a first end and a second end that is configured to be coupled to a side gear in a differential. The wheel flange is disposed at the first end and is configured to support a vehicle wheel. The wheel flange includes an axially extending annular hub and a wheel mount extending radially outwardly from the annular hub. The wheel mount is configured to couple a vehicle wheel to the drive axle shaft. The elongate tubular body and the wheel flange are formed as a unitary body without any weld therebetween.

Another embodiment relates to a drive axle shaft including an elongate tubular body and a wheel flange. The elongate tubular body is disposed about a longitudinal axis and has a first end and a second end configured to be coupled to a side gear in a differential. The wheel flange is disposed at the first end and is configured to support a vehicle wheel. The elongate tubular body and the wheel flange are formed as a unitary body without any weld therebetween. The elongate tubular body is hollow along its entire length.

The foregoing and other aspects, features, details, utilities, and advantages of the present application will be apparent from reading the following description and claims, and from reviewing the accompanying drawings.

BRIEF DESCRIPTION OF THE DRAWINGS

FIGS. 3A-3K are schematic and cross-sectional drawings illustrating steps in a method for forming an axle shaft in accordance with various embodiments of the present application.

DETAILED DESCRIPTION

This application relates to axle shafts. In particular, the application relates to a variable-wall light-weight drive axle shaft with an integral flange member and a method for forming the drive axle shaft.

A method for forming a drive axle shaft in accordance with one embodiment of the application includes the step of inserting a tubular blank in a first die. The first die includes a die orifice. The method further includes the steps of extruding the tubular blank through the die orifice to form an elongate tubular body with a longitudinal axis and heating a first longitudinal end portion of the tubular body. The method further includes the step of inserting the tubular body into a bore in a support apparatus. The support apparatus defines a second die at one end surrounding the bore and the first longitudinal end portion of the tubular body projects outwardly from the bore. The method further includes the step of providing a third die. The third die comprises a mandrel configured to be received within the tubular body. The method further includes the step of forming a wheel flange by moving at least one of the support apparatus and the third die toward the other of the support apparatus and the third die to deform the first longitudinal end portion of the tubular body between the second and third dies.

A drive axle shaft in accordance with one embodiment of the application includes an elongate tubular body disposed about a longitudinal axis. The tubular body has a first longitudinal end portion, an intermediate portion, and a second longitudinal end portion configured for coupling to a side gear in a differential. The drive axle shaft further includes a wheel flange configured to support a vehicle wheel disposed at the first longitudinal end portion of the tubular body. The elongate tubular body and the wheel flange are formed as a unitary body without any weld therebetween.

A drive axle shaft and a method for forming the drive axle shaft in accordance with the present application represent an improvement relative to conventional drive axle shafts and forming methods. By using successive blanks and positioning the blanks and tools, the inventive method allows rapid production of axle shafts while also allowing the shafts to be formed with varying inner and outer diameters. In addition, producing the wheel flange directly from the extruded shaft body reduces the time required for production of the axle shaft and eliminates certain equipment required for friction welding of the flange and shaft body thereby resulting in lower manufacturing costs. Further, by eliminating the joint between the flange and shaft body, the strength of the axle shaft is increased. Finally, forming the wheel flange directly from the extruded shaft body may be produce a hollow flange thereby further reducing the weight of the axle shaft.

Figure 1:
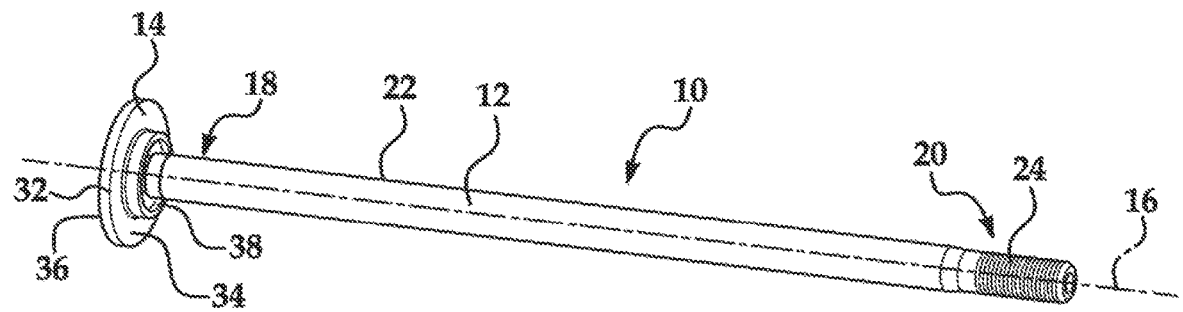
FIG. 1 is a perspective view of an axle shaft formed in accordance with a method in accordance with one embodiment of the present application.
Figure 2:
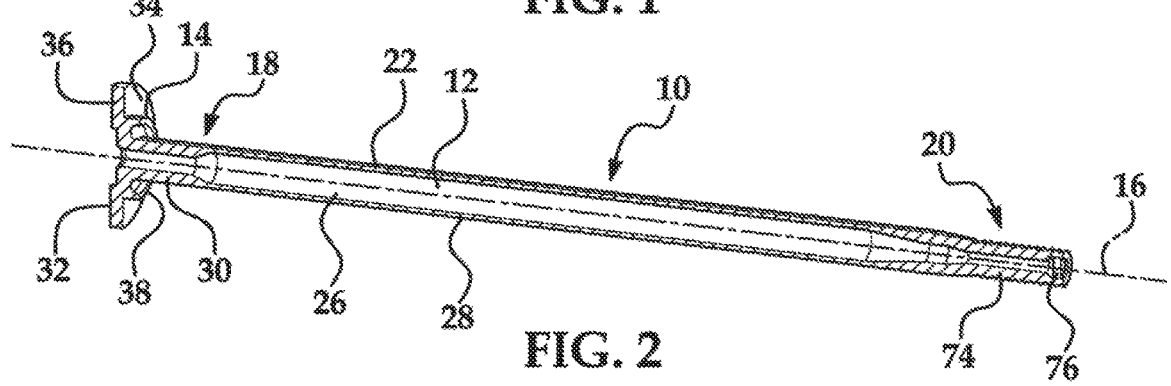
FIG. 2 is a cross-sectional view of the axle shaft of FIG. 1.

Referring now to the drawings wherein like reference numerals are used to identify identical components in the various views, FIGS. 1-2 illustrate one embodiment of an axle shaft 10 that may be formed using a method in accordance with the present application. Shaft 10 is particularly adapted for use in a vehicle drive axle and, more particularly, a rear drive axle. It should be understood, however, that the methods disclosed herein can be used in the formation of axle shafts for front drive axles and in other vehicular and non-vehicular power transmission applications. Shaft 10 may include a tubular body 12 and a wheel flange 14.

Body 12 may be used to transfer torque between a drive member and a driven member such as from a vehicle drivetrain (not shown) to one or more vehicle wheels (not shown). Body 12 may be made from conventional metals and metal alloys. Body 12 is elongate and is disposed about, and may be centered about, a rotational axis 16. One longitudinal end portion 18 of body 12 may be formed into flange 14, flange 14 being configured to support a vehicle wheel. The other longitudinal end portion 20 of body 12 may be coupled to a side gear (not shown) in a differential. Body 12 also includes an intermediate portion 22 between end portions 18, 20. Referring again to FIG. 1, the radially outer surface of end portion 20 may define a plurality of axially extending splines 24 configured to engage corresponding splines in a bore of side gear in order to couple shaft 10 for rotation with the side gear. The splines 24 may be formed by, for example, rolling or swaging. Body 12 is tubular or hollow in order to reduce the weight of axle shaft 10 relative to conventional solid axle shafts and defines a bore 26 extending along a portion or all of the length of body 12. The outer and/or inner diameters of body 12 may vary to define a wall 28 of varying thickness (and a bore 26 of varying diameter) along the length of body 12 in order to accommodate variations in loads along the length of body 12. It should be understood, however, that the variation in wall 28 shown in body 12 is exemplary only and that the inner and/or outer diameters of wall 28 may vary depending on the application to accommodate anticipated needs in terms of strength, packaging, and other parameters. Bore 26 may be machined at either end portion 18, 20 to define internal threads, grooves or other formations configured to receive a plug or other type of seal (not shown) used to prevent changes to the fluid levels and fluid flow dynamics in the differential and any potential contamination of the differential fluids and components.

Wheel flange 14 is provided to support a driven member such as a vehicle wheel and to couple the driven member to axle shaft 10 for rotation therewith. As described in greater detail hereinbelow, body 12 and flange 14 may be formed as a unitary body without any weld therebetween. For example and without limitation, flange 14 can be integrally formed from longitudinal end portion 18 of body 12 during a "warm-forming" process subsequent to an extrusion process for forming body 12 (described in more detail herein below). Flange 14 includes an axially extending annular hub 30. The outboard end of hub 30 may be closed with a plug or seal to prevent foreign objects and elements from entering bore 26 in body 12. Flange 14 also includes a wheel mount 32 that extends radially outwardly from hub 30. Wheel mount 32 may be generally circular in shape and may include a plurality of bores (not shown) extending parallel to axis 16 and configured to receive bolts (not shown) used to support the vehicle wheel. Wheel mount 32 defines an inboard side 34 and an outboard side 36. Inboard side 34 may include an axially inboard extending annular ring 38 disposed radially between hub 30 and the radially outer periphery of wheel mount 32.

Figure 3A:
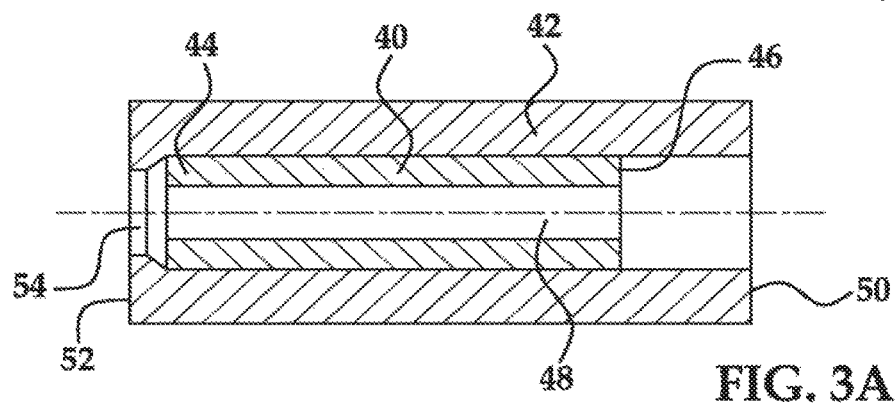

Referring now to FIGS. 3A-3K, methods for forming an axle shaft, such as axle shaft 10, in accordance with various embodiments of the present application will be described. Referring to FIG. 3A, the method may begin with the step of inserting a tubular blank 40 in a die 42. Blank 40 is made from conventional metals and metal alloys with a material composition and size selected depending on the needs of the application. Blank 40 may be cut to length from a longer pole of the selected material. Blank 40 has a leading end 44 and a trailing end 46 with leading end 44 inserted into die 42 before trailing end 46. Blank 40 also defines a bore 48 that extends along the length of blank 40 between ends 44, 46. Prior to insertion of blank 40 into die 42, a reactive forming lubricant may be applied to blank 40. Die 42 is tubular in shape, is pre-stressed, and defines an inlet end 50 and an outlet end 52. The opening formed at inlet end 50 has a diameter sized to receive blank 40 in an undeformed state. The opening formed at outlet end 52 has a diameter that is smaller than the diameter of the opening at inlet end 50 (and the undeformed blank 40) and comprises a die orifice or extrusion throat 54 through which blank 40 is extruded beginning with leading end 44 of blank 40 and ending with trailing end 46 of blank 40. The area in die 42 immediately preceding outlet end 52 comprises a reduction zone and the diameter of this area may vary to create an angled surface to promote efficient material flow.

Figure 3B:
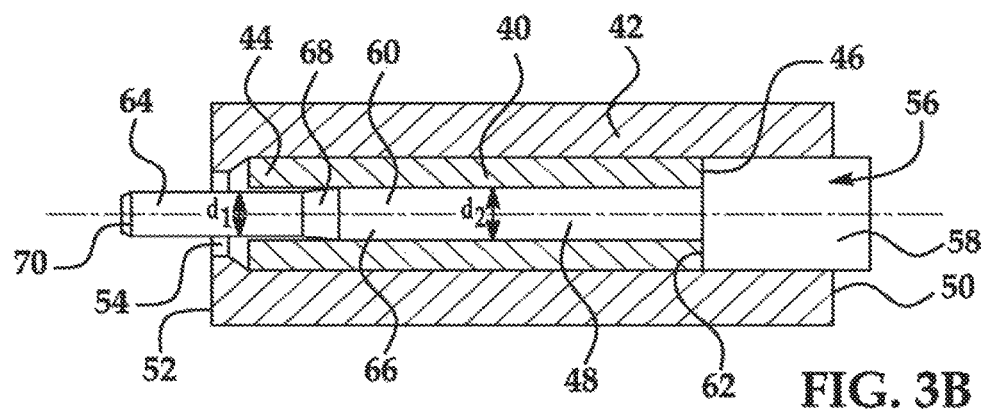

Referring to FIGS. 3B-3E, the method may continue with the step of extruding blank 40 through the die orifice 54 to elongate blank 40 and form body 12. Referring to FIG. 3B, the extrusion may begin with the substep of inserting a tool 56 into die 42. Tool 56 may comprise a punch or similar tool. Tool 56 includes a body 58 and a mandrel 60 extending from body 58. Body 58 has a diameter that is about equal to the inner diameter of die 42 and the outer diameter of blank 40. Body 58 defines a surface 62 at one end configured to engage trailing end 46 of blank 40. Mandrel 60 is configured to be received within bore 48 of blank 40 and extrusion throat 54 of die 42. Mandrel 60 may have a varying diameter along its length. In the illustrated embodiment, mandrel 60 includes a first portion 64 having a first diameter $d_1$ and a second portion 66 having a second diameter $d_2$ that is different from diameter $d_1$. In the illustrated embodiment, diameter $d_2$ is greater than diameter $d_1$. Mandrel may also include a tapered portion 68 between portions 64, 66. It should be understood that mandrel 60 may have one or more than one portions having different diameters and that the diameters can increase or decrease moving from portion to portion along the length of mandrel 60. The extruding step may continue with the substep of moving tool 56 within die 42 such that surface 62 engages trailing end 46 of blank 40 and a leading end 70 of portion 64 of mandrel 60 exits blank 40 and extends beyond leading end 44 of blank 40.

Figure 3C:
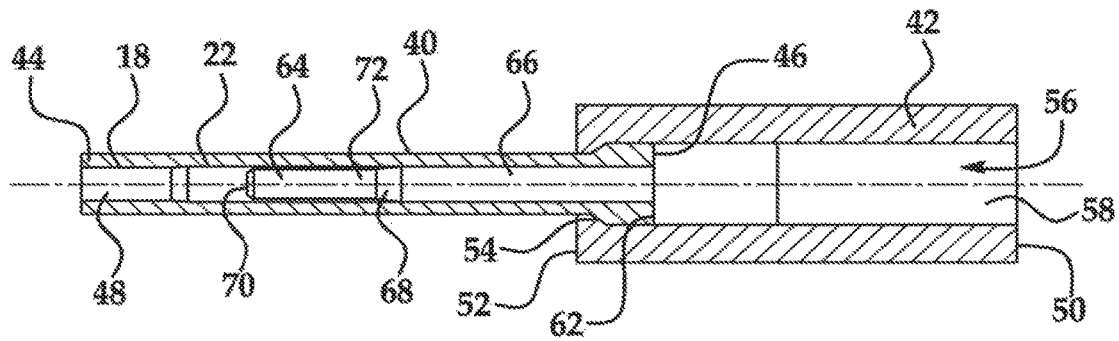

Referring to FIG. 3C, the extruding step may continue with the step of applying a force to tool 56 to move tool 56 towards the outlet end 52 of die 42 and extrude blank 40 through orifice 54 to begin forming the tubular body 12 of the axle shaft 10. As the leading end 44 of blank 40 is extruded through die 42, the leading end 44 collapses about mandrel 60 and end portion 18 of the body 12 (from which flange 14 may be formed) assumes a shape having an outer diameter defined by throat 54 and an inner diameter and length defined by a trailing end 72 of portion 64 of mandrel 60. As tool 56 continues to move towards outlet end 52 of die 42, portion 64 of mandrel 60 exits die 42 and portion 66 of mandrel 60 moves into and through throat 54 of die 42. As a result, intermediate portion 22 of body 12 assumes a shape having an outer diameter defined by throat 54 and inner diameter and length defined by portion 66 of mandrel 60. A stepped or gradual transition portion may be formed between end portion 18 and intermediate portion 22 depending on the shape of mandrel 60 (and particularly portion 68 of mandrel 60).

Figure 3D:
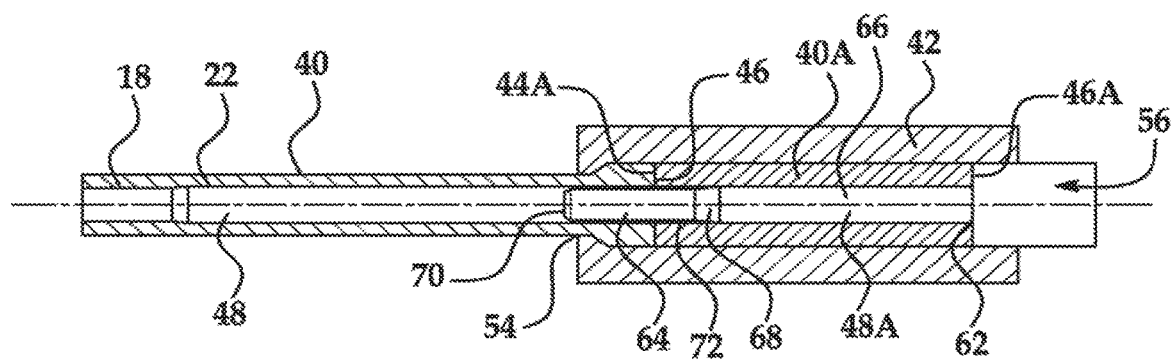

Referring to FIG. 3D, once tool 56 has reached a predetermined position, the extruding step may continue with the steps of withdrawing tool 56 from die 42 and inserting another tubular blank 40A into die 42. Blank 40A is moved within die 42 until the leading end 44A of blank 40A engages the trailing end 46 of blank 40. The extruding step may further continue with the substeps of reinserting tool 56 into die 42 and moving tool 56 within die 42 until surface 62 of tool 56 engages the trailing end 46A of blank 40A. At this point, mandrel 60 extends through bore 48A of blank 40A and leading end 70 of portion 64 of mandrel 60 exits blank 40A and extends beyond leading end 44A of blank 40A into trailing end 46 of blank 40. In an alternative embodiment of the application, as opposed to reinserting tool 56 into die 42, a different tool may be inserted into die 42. Using a different tool permits further variation in the formation of the inner diameter of blank 40 and the wall thickness of body 12. For example and without limitation, the mandrel of the different tool may be configured to form end portion 20 of body 12 in such a way that a portion 74 (shown in FIG. 2) of the end portion 20 is relatively thick to provide support for subsequent spline forming operations and/or formation of a ring groove for use in receiving a retaining clip used to prevent outboard movement of shaft 12 from the vehicle differential, while another portion 76 (shown in FIG. 2) of the end portion 20 inboard from portion 74 is relatively thin to reduce the need for material removal when forming the inner diameter of end portion 20 to receive a plug or seal.

Figure 3E:
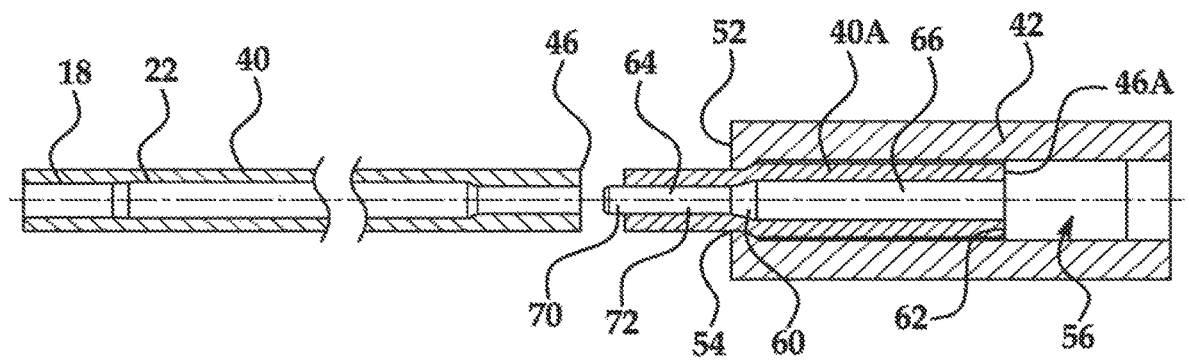

Referring to FIG. 3E, the extruding step may continue with the substep of applying a force to tool 56 to move the tool 56 towards outlet end 52 of die 42 such that end portion 20 of body 12 of shaft 10 assumes a shape having an outer diameter defined by throat 54 and an inner diameter defined by the leading end 70 of portion 64 of mandrel 60. Once the trailing end 46 of blank 40 is ejected from die 42, extrusion of blank 40A may begin in the same manner as blank 40. In the illustrated embodiment, the extrusion of blank 40A can begin without removal of tool 56. Alternatively, if a different tool is used to form end portion 20 of body 12, the different tool may be removed and tool 56 reinserted into die 42.

Figure 3F:
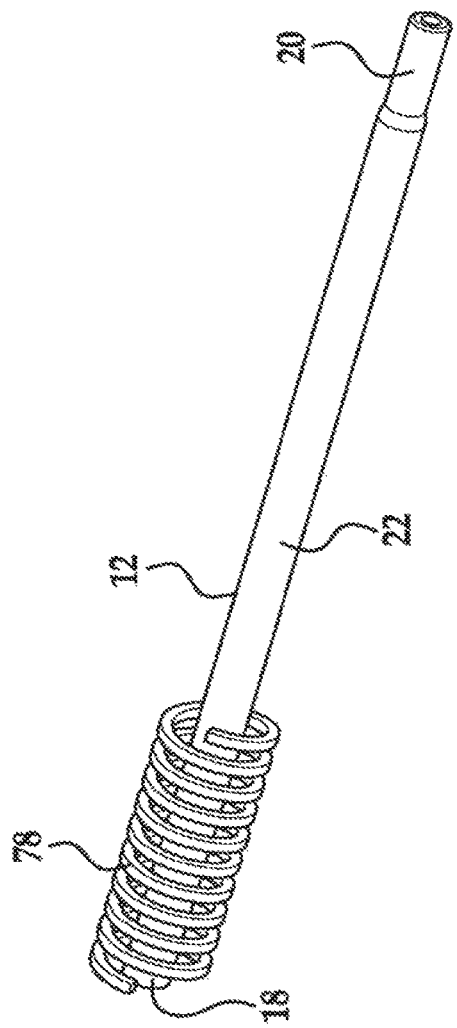

Referring now to FIG. 3F, the method may continue with the step of heating longitudinal end portion 18 of body 12. Heating of end portion 18 allows for subsequent formation of wheel mount 32 of flange 14. Heating may be selective (i.e., targeted) such that only the segment of end portion 18 that will be formed into wheel mount 32 may be heated. In one embodiment of the inventive method, heating may be accomplished via induction heating. In the illustrated embodiment, a coil 78 and end portion 18 of body 12 are positioned such that coil 78 surrounds longitudinal end portion 18 of body 12. Coil 78 is energized by a power supply (not shown) and generates a magnetic field. The field induces eddy currents in longitudinal end portion 18 of body 12, which may be composed of an electrically conductive material, such as alloy steel. Electrical resistance in longitudinal end portion 18 leads to resistance or Joule heating of end portion 18. Although an embodiment of the application is described and illustrated herein that relies on induction heating, one of ordinary skill in the art will understand that the step of heating longitudinal end portion 18 of body 12 may be accomplished in various ways other than through induction heating.

Figure 3G:
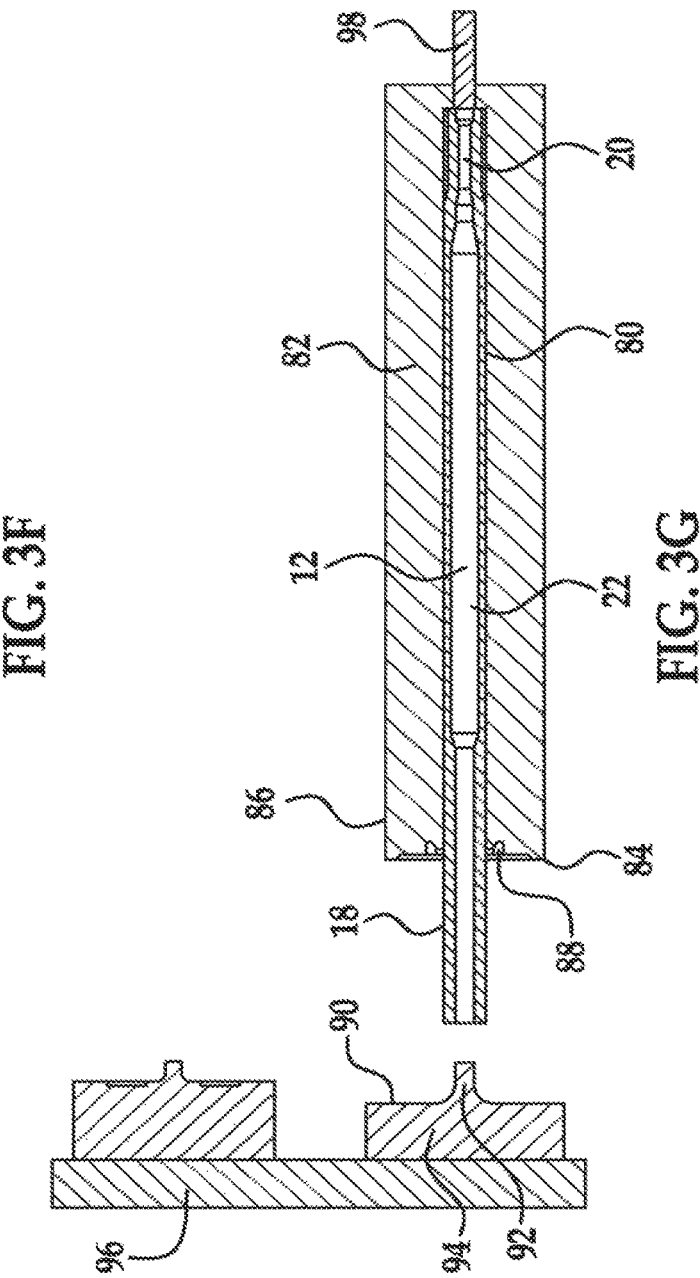

Referring to FIG. 3G, the method may continue with the step of inserting body 12 into a bore 80 in a support apparatus 82. Support apparatus 82 is generally configured to support the unheated portion of body 12 (e.g., at least one of end portion 20 and intermediate portion 22 of body 12) while longitudinal end portion 18 of body 12 projects outwardly from bore 80. Support apparatus 82 may define a die 84 at one end 86 of support apparatus 82. Die 84 may be formed on an external surface of apparatus 82 in an end face of apparatus 82 and may surround bore 80. Die 84 has a shape complementary to the desired shape of inboard side 34 of wheel mount 32 and may therefore define a cavity 88 corresponding to ring 38 formed on inboard side 34 of wheel mount 32. In the illustrated embodiment, support apparatus 82 is a unitary body. It should be understood, however, that support apparatus 82 may be formed in multiple pieces and, further, that support apparatus 82 (and die 84) may be configured in a variety of ways depending on the application.

Still referring to FIG. 3G, the method may continue with the step of providing another die 90 comprising a mandrel 92 configured to be received within bore 26 of body 12. Die 90 may be supported on a base 94. Die 90 may be configured to preform or prepare longitudinal end portion 18 of body 12 for subsequent processing. In one embodiment, mandrel 92 has an outer diameter that varies in some portions across its length. In the illustrated embodiment, mandrel 92 curves radially outwardly proximate base 94 such that its outer diameter increases in an axial direction moving from one end of mandrel 92 distance from base 94 towards an opposite end of mandrel 92 adjacent base 94. One of ordinary skill in the art will understand that the rate of change in diameter in mandrel 92 may be constant (as in a conical shape) or may vary.

Figure 3H:
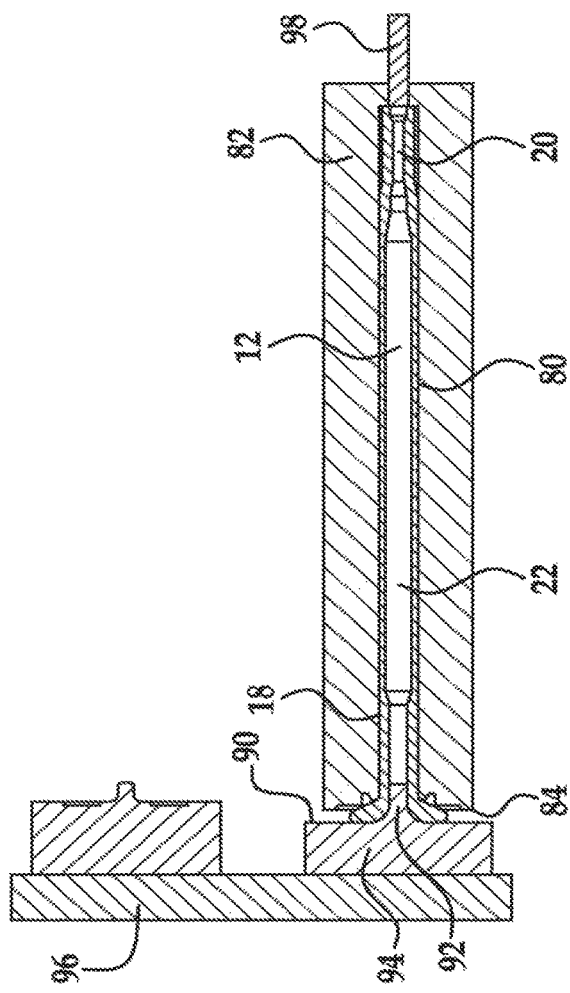

Referring to FIG. 3H, the method may continue with the step of moving at least one of support apparatus 82 and die 90 toward the other of support apparatus 82 and die 90 to expand longitudinal end portion 18 of body 12 radially outwardly between dies 84, 90. Die 90 may be mounted on a shuttle 96 configured to move die 90 in at least a radial direction and an axial direction relative to axis 16. Movement of shuttle 96 may be controlled using fluid (hydraulic or pneumatic) actuators and shuttle 96 may include retaining clamps to retain die 90 on shuttle 96. In one embodiment, support apparatus 82 remains stationary while shuttle 96 moves die 90 toward support apparatus 82. Shuttle 96 may be configured to stop at a predetermined position along axis 16 such that die 90 does not contact die 84. Movement of apparatus 82 and/or die 90 towards one another compresses longitudinal end portion 18 of body 12 and causes longitudinal end portion 18 of body 12 to expand in the radial direction. One of ordinary skill in the art will understand that the steps illustrated in FIG. 3G and FIG. 3H for preforming or preparing longitudinal end portion 18 for subsequent processing may not be required. Furthermore, it should be understood that further preforming of longitudinal end portion 18 may occur in using additional dies or other tools. After the preforming steps are complete, the method may optionally include the step of temporarily displacing body 12 within apparatus 82 by applying a force to end portion 20 of body 12 to force at least an additional portion of body 12 to exit bore 80. In this manner, the heated end portion 18 of body 12 is shifted away from die 84 to prevent unnecessary heat transfer to die 84 during those times that forming operations are not occurring (e.g., while shuttle 96 is in motion). An endcap 98 of a conventional ejector assembly (not shown) may be extend through a bore in the end of apparatus 82 opposite end 86 and engage end 20 of body 12 to enable transfer of force from the ejector assembly.

Figure 3I:
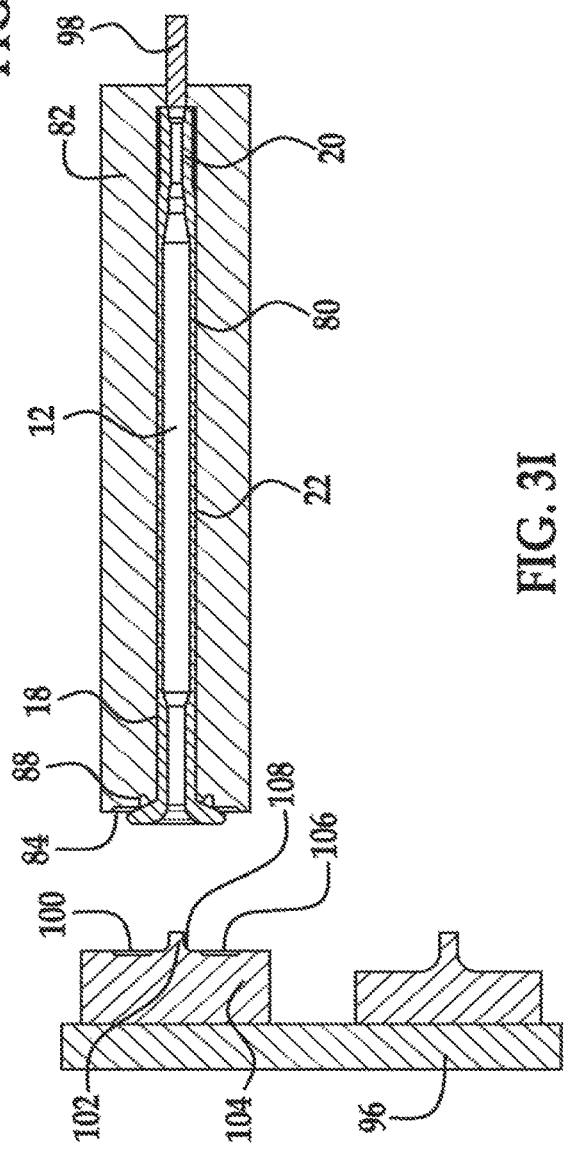

Referring to FIG. 3I, the method may continue with the step of providing another die 100. Die 100 may be configured to form outboard side 36 of wheel mount 32 of flange 14 (shown in FIGS. 1-2). Die 100 may include a base 102, a mandrel 104 that extends from base 102 and is configured to be received within body 12, a cavity 106, and a circumferential step 108 disposed radially between mandrel 104 and cavity 106. In one embodiment, mandrel 104 has an outer diameter that may vary in some portions across its length. In the illustrated embodiment, mandrel 104 curves radially outwardly proximate base 102 such that its outer diameter increases in an axial direction moving from one end of mandrel 104 distant from base 102 towards an opposite end of mandrel 104 adjacent base 102. One of ordinary skill in the art will understand that the rate of change in diameter in mandrel 104 may be constant (as in a conical shape) or may vary. In the illustrated embodiment, the length of mandrel 104 as measured from base 102 is less than the length of mandrel 92 on die 90 as measured from base 94 of die 90. It should be understood, however, that the shape and configuration of mandrels 92, 104 (and dies 90, 100 generally) may vary depending on the application.

Referring to FIG. 3J, the method may continue with the step of forming wheel mount 32 of flange 14 by moving at least one of said support apparatus 82 and die 100 toward the other of support apparatus 82 and die 100 to deform longitudinal end portion 18 of body 12 between dies 84, 100. Die 100 may be mounted on shuttle 96 such that shuttle 96 may move die 100 in at least the radial direction and the axial direction relative to axis 16. In other embodiments, die 100 may mounted on another shuttle. Mounting dies 84, 100 on the same shuttle 96, however, enables more rapid and refined control of the manufacturing process. In one embodiment, support apparatus 82 remains stationary while shuttle 96 moves die 100 toward support apparatus 82. Shuttle 96 may be configured to stop at a predetermined position along axis 16 such that die 84 on support apparatus 82 contacts base 104 of die 100. Such movement causes longitudinal end portion 18 of body 12 to deform and extend (in the radial and axial directions) into cavity 106 of die 100 and cavity 88 of die 84, thus forming the inboard and outboard sides 32, 34, respectively, of wheel mount 32 of flange 14 (shown in FIGS. 1-2). Any excess material protruding from flange 14 may be subsequently removed by machining or shearing (trimming) operations. Once the step of forming wheel mount 32 of flange 14 is complete, shuttle 96 may retract in the radial and/or axial directions so that body 12 can be ejected from support apparatus 82.

Referring to FIG. 3K, the method may continue with the step of ejecting body 12 from support apparatus 82. As discussed hereinabove, this step may include the substep of applying a force to end portion 20 of body 12 (e.g., through endcap 98) to urge body 12 to exit bore 80 of apparatus 82. Thereafter, the completed axle shaft 10 may be allowed to cool.

A drive axle shaft 10 and a method for forming the drive axle shaft 10 in accordance with the present application represent an improvement relative to conventional drive axle shafts and forming methods. By using successive blanks 36, 36A and positioning the blanks 36, 36A and tools 52, the inventive method allows rapid production of axle shafts 10 while also allowing the shafts 10 to be formed with varying inner and outer diameters. In addition, producing the wheel flange 14 directly from the extruded shaft body 12 reduces the time required for production of the axle shaft 10 and eliminates certain equipment required for friction welding of the flange 14 and shaft body 12 thereby resulting in lower manufacturing costs. Further, by eliminating the joint between the flange 14 and shaft body 12, the strength of the axle shaft 10 is increased. The inventive method may also result in a flange 14 that, like body 12, is hollow thereby further reducing the weight of shaft 10.

While one or more particular embodiments have been shown and described, it will be understood by those of skill in the art that various changes and modifications can be made without departing from the spirit and scope of the present teachings.

What is claimed is:

1. A drive axle shaft, comprising:
   an elongate tubular body having a longitudinal axis and comprising a first end and a second end, wherein the second end is configured to be coupled to a side gear in a differential; and
   a wheel flange disposed at the first end and configured to support a vehicle wheel, wherein the wheel flange includes a ring extending perpendicularly from an axially inboard side of the wheel flange a distance that is at least half the thickness of the wheel flange;
   wherein a radially outer wall of the ring extends as a right cylinder from the wheel flange; and
   wherein the elongate tubular body and the wheel flange are formed as a unitary body without any joint therebetween.

2. The drive axle shaft of claim 1, wherein the elongate tubular body is hollow along its entire length.

3. The drive axle shaft of claim 2, wherein the wheel flange is hollow along its entire length.

4. The drive axle shaft of claim 2, wherein a wall thickness of the tubular body varies along a length of the tubular body.

5. The drive axle shaft of claim 4, wherein the first end has a first wall thickness and the second end has a second wall thickness that is less than the first wall thickness.

6. The drive axle shaft of claim 1, wherein the wheel flange includes an axially extending annular hub.

7. The drive axle shaft of claim 6, wherein the wheel flange further includes a wheel mount extending radially outwardly from the annular hub, wherein the wheel mount is configured to couple a vehicle wheel to the drive axle shaft.

8. The drive axle shaft of claim 7, wherein the ring has a radially inner wall disposed radially between the radially outer wall and the annular hub.

9. The drive axle shaft of claim 1, wherein the wheel flange includes an axially extending annular hub and a wheel mount extending radially outwardly from the annular hub, and wherein the wheel mount is configured to couple a vehicle wheel to the drive axle shaft.

10. The drive axle shaft of claim 9, wherein the cylindrical ring has a radially outer wall disposed radially apart from the annular hub and a radially inner wall disposed radially between the radially outer wall and the annular hub.

11. A drive axle shaft, comprising:
an elongate tubular body having a longitudinal axis and comprising a first end and a second end, wherein the second end is configured to be coupled to a side gear in a differential; and
a wheel flange disposed at the first end and configured to support a vehicle wheel, wherein the wheel flange includes an axially extending annular hub, a wheel mount extending radially outwardly from the annular hub, and a ring extending perpendicularly from an axially inboard side of the wheel flange;
wherein the wheel mount is configured to couple a vehicle wheel to the drive axle shaft; and
wherein the elongate tubular body and the wheel flange are formed as a unitary body without any joint therebetween.

12. The drive axle shaft of claim 11, wherein the elongate tubular body is hollow along its entire length.

13. The drive axle shaft of claim 12, wherein the wheel flange is hollow along its entire length.

14. The drive axle shaft of claim 12, wherein a wall thickness of the tubular body varies along a length of the tubular body.

15. The drive axle shaft of claim 14, wherein the first end has a first wall thickness and the second end has a second wall thickness that is less than the first wall thickness.

16. The drive axle shaft of claim 11, wherein the wheel mount defines an inboard side and an outboard side, wherein the inboard side includes the ring disposed radially between the annular hub and an outer periphery of the wheel mount, wherein the ring has a radially outer wall disposed radially apart from the annular hub, and a radially inner wall that is disposed between the radially outer wall and the annular hub.

17. A drive axle shaft, comprising:
an elongate tubular body disposed about a longitudinal axis and having:
a first end; and
a second end configured to be coupled to a side gear in a differential; and
a wheel flange disposed at the first end and configured to support a vehicle wheel,
wherein the wheel flange includes a cylindrical ring extending perpendicularly from an inboard side of the wheel flange;
wherein the elongate tubular body and the wheel flange are formed as a unitary body without any joint therebetween; and
wherein the elongate tubular body is hollow along its entire length.

18. The drive axle shaft of claim 17, wherein the wheel flange is hollow along its entire length.

19. The drive axle shaft of claim 17, wherein a wall thickness of the tubular body varies along a length of the tubular body.

20. The drive axle shaft of claim 19, wherein the first end has a first wall thickness and the second end has a second wall thickness that is less than the first wall thickness.

* * * * *